United States Patent [19]
Davis et al.

[11] Patent Number: 5,290,987
[45] Date of Patent: Mar. 1, 1994

[54] ELECTRICAL DISCHARGE MACHINING APPARATUS

[75] Inventors: Paul J. Davis, Lyndon Township, Washtenaw County; Myron C. Johnson, Freeland, both of Mich.

[73] Assignee: Charmilles Technologies Manufacturing Corporation, Owosso, Mich.

[21] Appl. No.: 990,675

[22] Filed: Dec. 14, 1992

[51] Int. Cl.⁵ .............................................. B23H 11/00
[52] U.S. Cl. .............................. 219/69.11; 219/69.14
[58] Field of Search ........................... 219/69.11, 69.14

[56]  References Cited
U.S. PATENT DOCUMENTS

| | | | |
|---|---|---|---|
| 2,773,968 | 12/1956 | Martellotti et al. | 219/69.11 |
| 2,818,490 | 12/1957 | Dixon et al. | 219/69.15 |
| 2,909,640 | 10/1959 | Fairbrother | 219/69.15 |
| 3,541,291 | 11/1970 | Johanson | 219/69.16 |
| 4,316,071 | 2/1982 | Bonga | 219/69.11 |
| 4,387,284 | 6/1983 | Nicholas et al. | 219/69.11 |
| 4,406,938 | 9/1983 | Yamada et al. | 219/69.14 |
| 4,622,449 | 11/1986 | Inoue | 219/69.11 |
| 4,755,651 | 7/1988 | Tsutsui et al. | 219/69.14 |
| 4,952,767 | 8/1990 | Uemoto et al. | 219/69.11 |
| 4,996,762 | 3/1991 | Takayama | 219/69.11 |

FOREIGN PATENT DOCUMENTS

| | | | |
|---|---|---|---|
| 3824006 | 1/1990 | Fed. Rep. of Germany | 219/69.11 |
| 2-48113 | 2/1990 | Japan | 219/69.11 |
| 3-117517 | 5/1991 | Japan | 219/69.14 |
| 3-234415 | 10/1991 | Japan | 219/69.14 |

Primary Examiner—Geoffrey S. Evans
Attorney, Agent, or Firm—Gifford, Groh, Sprinkle, Patmore and Anderson

[57] ABSTRACT

An apparatus for electrical discharge machining (EDM) is disclosed having a housing and a workpiece support assembly secured to the housing for holding a workpiece in a predetermined location. An EDM electrode is attached to the housing for performing the EDM machining. A tank assembly is also attached to the housing and movable between a machining position and a retracted position. In the machining position, the tank assembly encompasses a workpiece secured to the workpiece support area and filled with a dielectric fluid necessary for the EDM machining process. In its retracted position, the tank assembly is spaced away from the workpiece to facilitate access to the workpiece for removal of the finished workpiece and reattachment of a new workpiece in preparation for the next EDM machining operation.

7 Claims, 3 Drawing Sheets

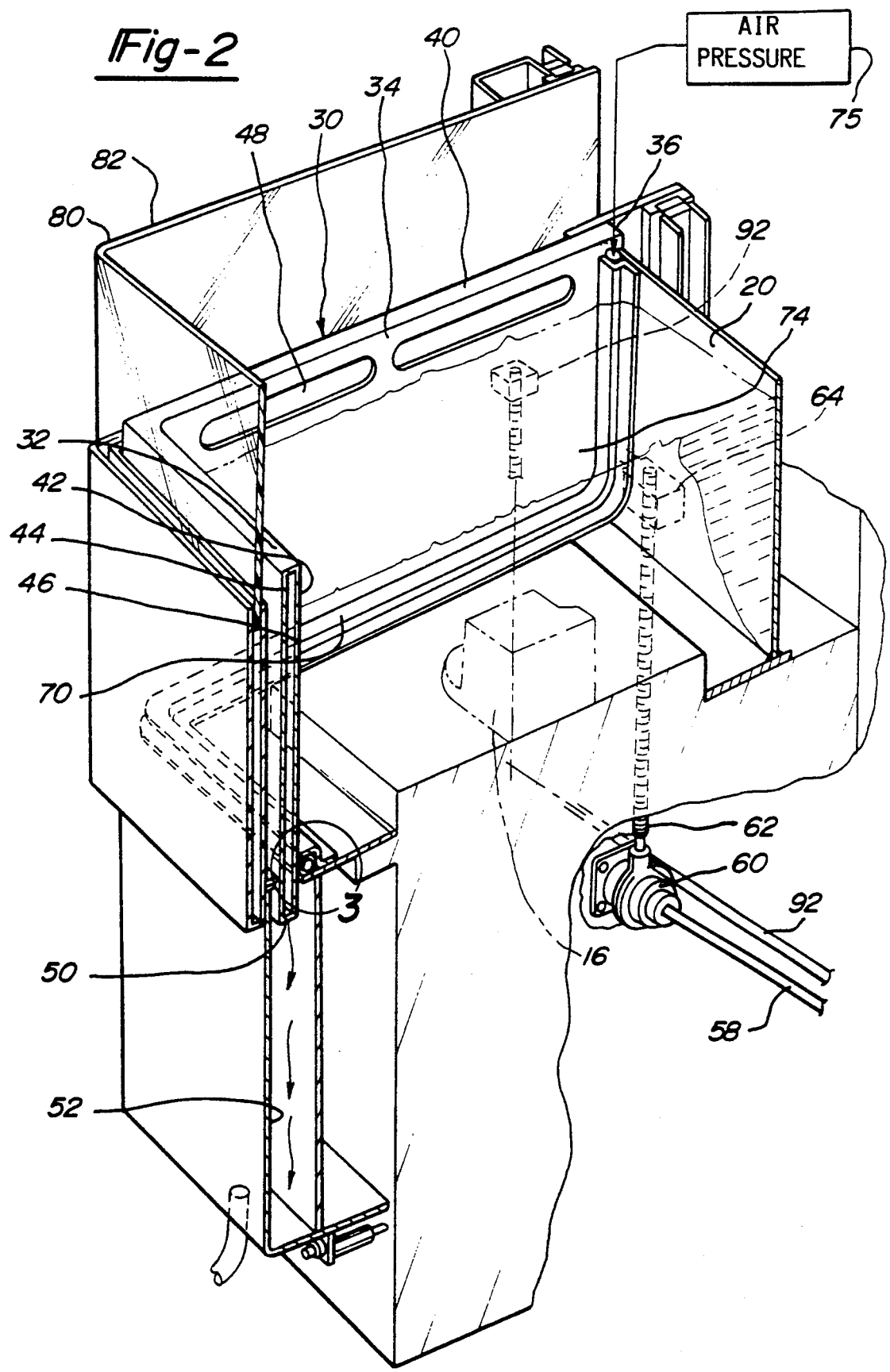

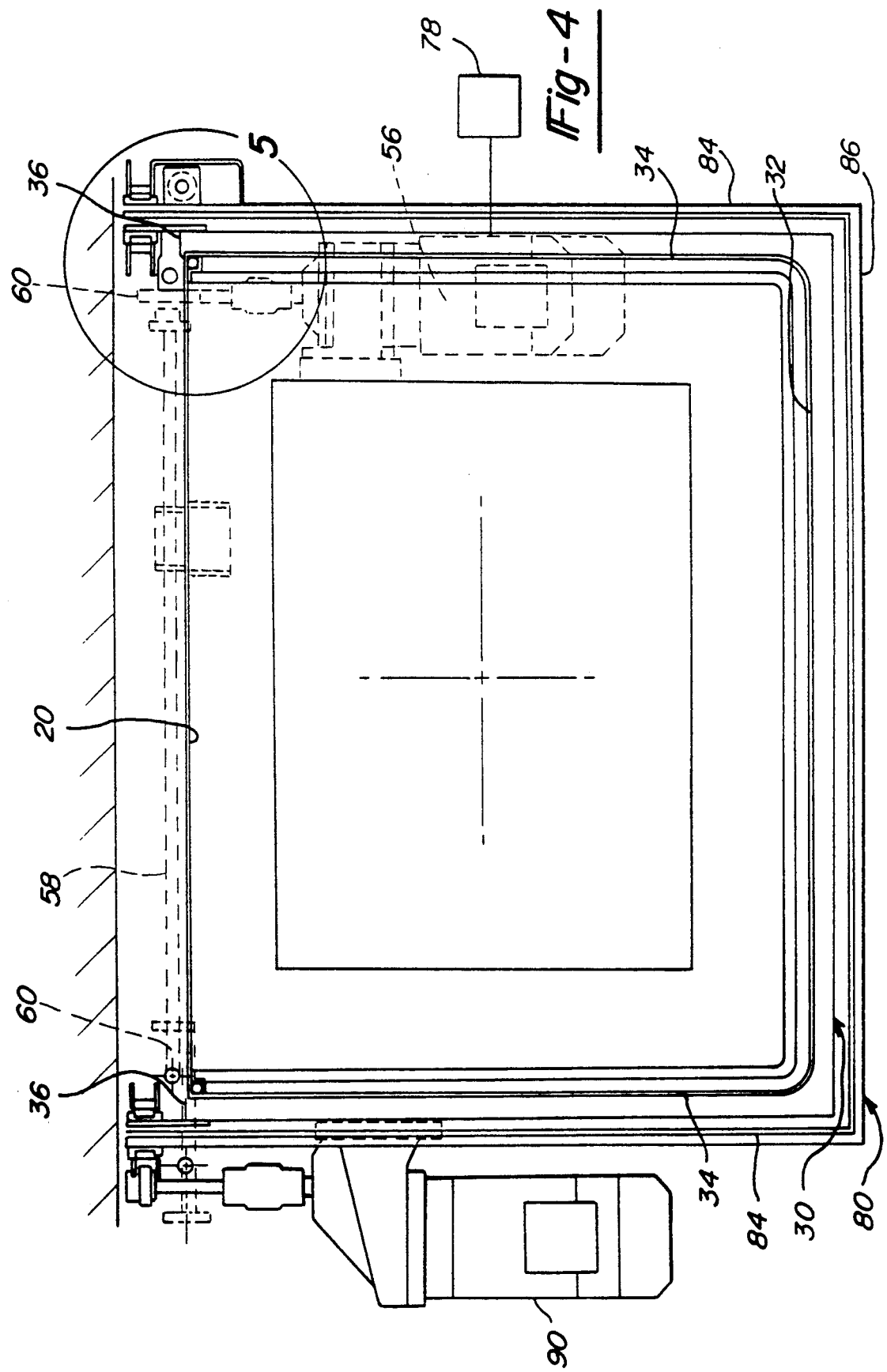

ELECTRICAL DISCHARGE MACHINING APPARATUS

BACKGROUND OF THE INVENTION

Field of the Invention

The present invention relates generally to an apparatus for performing electrical discharge machining operations on workpieces.

Description of the Prior Art

Electrical discharge machining (EDM) is a well-known process for machining electrical parts, particularly when high precision is required. In such previously known machines, the workpiece to be machined is positioned within a working tank which is at least partially filled with a dielectric liquid.

In order to perform the machining operation, an EDM probe or electrode is brought into contact with the workpiece which, through electrical discharge from the probe to the workpiece, ablates material from the workpiece thus performing the desired machining operation.

Since at least a portion of the workpiece is submerged within the dielectric fluid during the machining operation, an upper edge or rim of the holding tank must necessarily be positioned near or above the top of the workpiece. As such, the holding tank interferes with the removal of the finished workpiece from the workpiece holding means in the holding tank as well as the attachment of a new workpiece to the workpiece to be machined in the holding tank.

While the interference of the holding tank poses a relatively minor inconvenience when the workpieces are manually removed from and secured to the workpiece holder, the interference presented by the holding tank poses a more serious problem when the workpieces are secured to and removed from the workpiece holder by automatic material handlers or robots. In such situations, it is often times necessary for the automatic material handlers to include additional axes of movement in order to manipulate the workpiece through the top of the holding tank. Because of this, it has not been practical to automate many EDM operations.

SUMMARY OF THE PRESENT INVENTION

The present invention provides an EDM apparatus which overcomes all of the above-mentioned disadvantages of the abovementioned devices.

In brief, the device of the present invention comprises a housing having a workpiece support area and a holder assembly for securing the workpiece in the desired machining position in the workpiece support area. A conventional EDM probe or electrode is when mounted to the housing for performing EDM operations on the workpiece in the conventional fashion.

The present invention also includes a tank assembly which is movable between a machining position and a retracted position. In this machining position, the tank assembly encompasses the workpiece secured to the workpiece support area by the holder assembly. A seal assembly then fluidly seals the tank assembly to the housing so that the tank assembly can be filled with a dielectric liquid whereupon the EDM operation takes place.

Conversely, in its retracted position, the tank assembly is spaced away from the workpiece to facilitate access to the workpiece by automatic material handlers or the machine operator. Preferably, in its retracted position, the tank assembly is moved to a lower position with respect to the workpiece so that the top edge of the tank assembly is positioned below the workpiece.

In the preferred embodiment, a guard is also positioned around the tank assembly as a safety precaution. This guard, like the tank assembly is movable between an upper position during the EDM operation and a lower, retracted position to facilitate access to the workpiece to facilitate removal and installation of workpieces on the workpiece support area.

BRIEF DESCRIPTION OF THE DRAWING

A better understanding of the present invention will be had upon reference to the following detailed description when read in conjunction with the accompanying drawing, wherein like referenced characters refer to like parts throughout the several views, and in which;

FIG. 2 is a fragmentary sectional view illustrating a preferred embodiment of the present invention;

FIG. 4 is a top plan view illustrating a portion of the preferred embodiment of the present invention.

DETAILED DESCRIPTION OF A PREFERRED EMBODIMENT OF THE PRESENT INVENTION

Figure 1:
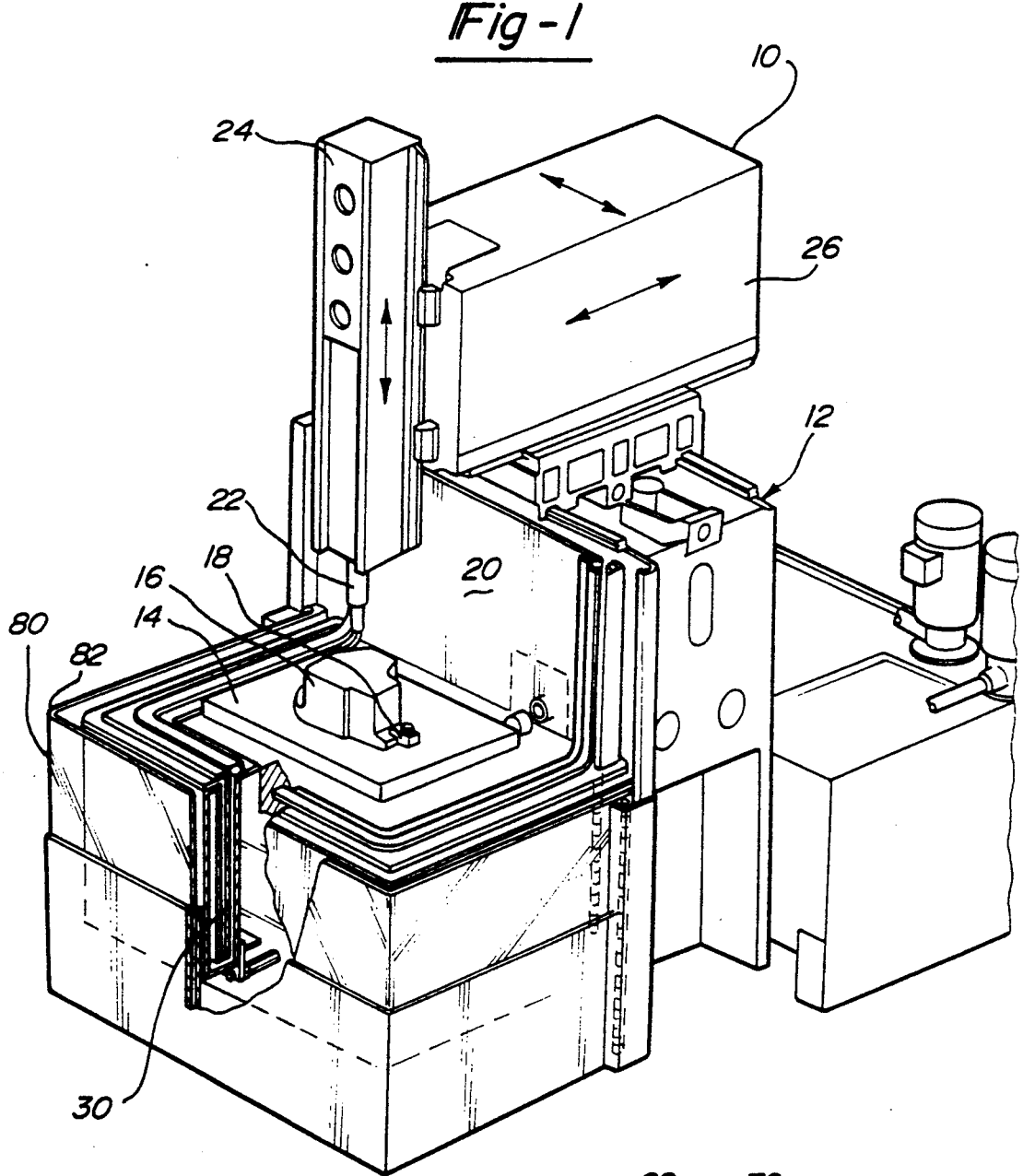
FIG. 1 is an elevational view illustrating a preferred embodiment of the present invention.

With reference first to FIG. 1, a preferred embodiment of the electrical discharge machining (EDM) apparatus 10 of the present invention is thereshown and comprises a housing 12. The housing 12 further includes a workpiece support area 14 on which a workpiece 16 to be machined is positioned. Any conventional means, such as a holder assembly 18, is used to secure the workpiece 16 in position on the surface 14 in preparation for the EDM operation. Furthermore, the housing 12 includes a generally flat wall 20 which extends vertically upwardly from a rear edge of the workpiece support area 14.

Still referring to FIG. 1, a conventional EDM electrode 22 is mounted on slides 24 and 26 to the housing 12. These slides 24 and 26 position the electrode 22 in the proper position for contact with the workpiece 16 during the EDM operation.

The construction of the electrode 22, slides 24 and 26 may be of any conventional construction. Consequently, a further description thereof is unnecessary.

With reference now to FIGS. 1, 2 and 4, the present invention further comprises a tank assembly 30 for containing dielectric fluid during the EDM operation. The tank assembly 30 includes a front wall 32 and spaced apart side walls 34. Thus, as best shown in FIG. 4, the tank assembly is generally U-shaped in cross-section so that a front edge of each side wall 34 is attached to opposed side edges of the front wall 32 while a rear edge 36 of each side wall 34 is positioned adjacent the upwardly extending housing wall 20.

In a fashion which will be subsequently described in greater detail, the tank assembly 30 is movable from a retracted or lower position, illustrated in FIG. 1, and an upper or machining position, illustrated in FIG. 2. With the tank assembly 30 in its upper or machining position (FIG. 2) the workpiece 16 is positioned between the tank assembly side walls 34 and also between the front wall 32 of the tank assembly 30 and the housing wall 20. In its upper or machining position, the tank assembly 30 thus encompasses the workpiece 16 such that the tank assembly 30 can hold the dielectric fluid during the machining operation. As such, a top edge 40 (FIG. 2) of the tank assembly 30 is positioned near or above the top of the workpiece 16 when the tank assembly 30 is in its machining position.

Conversely, when the tank assembly 30 is in its retracted or lower position (FIG. 1) the tank assembly 30 exposes the workpiece 16 and facilitates access to the workpiece 16 on the workpiece support area 14. Such access to the workpiece 16 is particularly advantageous when automatic material handlers or robots are utilized to position the workpiece 16 on the work surface 14 prior to the EDM operation or to remove the workpiece 16 from the work area 14 upon completion of the machining operation.

As best shown in FIG. 2, the walls 32 and 34 of the tank assembly 30 are preferably constructed from two spaced apart panes 42 and 44 forming a chamber 46 therebetween. Overflow openings 48 through one or more of the walls 34 and 40 are open to the chamber 46 and prevent overflowing of the dielectric fluid over the top edge 40 of the tank assembly 30. Drain holes 50 (FIG. 2) at the bottom of the chamber 46 are provided to remove any dielectric fluid which enters the chamber 46 through the overflow openings 48.

With reference now to FIGS. 1, 2 and 4, with the tank assembly 30 in its retracted or lower position, illustrated in FIG. 1, the walls 32 and 34 of the tank assembly 30 register with and are received within openings 52 formed in the housing 12 in a order to provide access to the workpiece 16 on the workpiece support surface 14. Conversely, with the tank assembly 30 in its raised position (FIG. 2) the tank assembly 30 is positioned above the housing openings 52.

As best shown in FIGS. 2 and 4, a motor 56 is employed to move the tank assembly 30 between its retracted and machining positions. Although any conventional means can be used to mechanically couple the motor 56 to the tank assembly 30, in the preferred embodiment of the invention, the motor 56 rotatably drives a shaft 58 having a gear assembly 60 at opposite sides of the tank assembly 30. A shaft 62 (FIG. 2) extends upwardly from each gear assembly 60 and threadably engages an internally threaded boss 64 attached to each tank assembly side wall 34. Consequently, activation of the motor 56 rotatably drives the shaft 58 in one direction, thus moving the tank assembly 30 from its lower and to its upper position. Reversal of the motor 56 rotatably drives the shaft 62 via the shaft 58 and gear assembly 60 in the opposite direction thus moving the tank assembly 30 from its raised and to its lower position.

Figure 3:
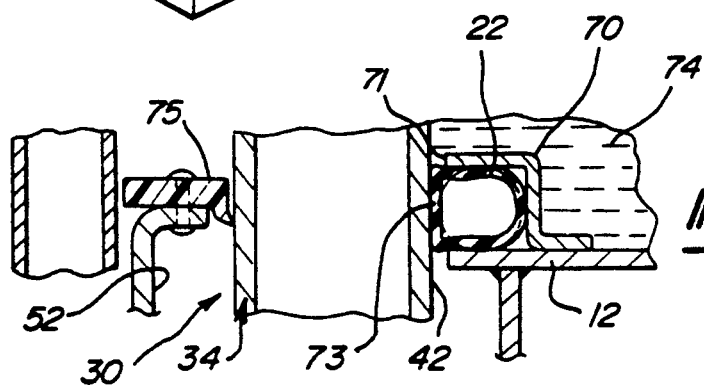
FIG. 3 is a view taken of Circle 3-3 in FIG. 2 and enlarged for clarity.

With reference now especially to FIGS. 2 and 3, a generally U-shaped housing channel 70 is attached to the housing 12 so that the channel extends horizontally along the front and sides of the workpiece support area 14 and vertically upwardly along both sides of the housing wall 20. Furthermore, the channel 70 has an open side 71 (FIG. 3) which faces outwardly from the workpiece support area 14. An inflatable bladder 72 is positioned within this housing channel 70 so that one side 73 (FIG. 3) of the bladder 72 is open to the tank assembly 30. The bladder 72, in turn, is fluidly connected to a source of air pressure 74 (FIG. 2).

With the tank assembly 30 in its raised position, inflation of the bladder 72 by the air source 74 fluidly seals the housing 18 to the tank assembly 30. A friction pod 75 (FIG. 3) abuts against the outside of the tank assembly 30 in registration with the bladder 72 to enhance the seal between the tank assembly 30 and the bladder 72. With the bladder 72 inflated, the tank assembly 30 forms a reservoir 74 around the workpiece 16 which is then filled with a dielectric fluid in preparation for the EDM operation.

Although the tank assembly 30 is shown in FIG. 2 in its fully raised position, a motor control means 78 (FIG. 4) controls the activation of the motor 56 to raise the tank assembly to any desired position between its fully raised and fully lowered position. Thus, for different workpieces, it would only be necessary to raise the tank assembly 30 to a position intermediate its uppermost and lowermost position, thus reducing the machining cycle time for the EDM machine 10.

With reference now to FIGS. 2 and 4, in order to enhance the safety of the EDM machine 10, a guard assembly 80 is slidably mounted to the housing 12 and is movable between a lower position, illustrated in FIG. 1 in a raised position, illustrated in FIG. 2. In its lower position, a top edge 82 of the guard assembly 80 is positioned below the workpiece 16 to facilitate access to the workpiece 16 by an operator or an automatic material handling system. Conversely, in its raised position (FIG. 2) the top edge 82 of the guard assembly 80 is positioned above the top edge 40 of the tank assembly 30, thus preventing contact between the reservoir 74 and a worker.

As best shown in FIG. 4, the guard assembly 80, like the tank assembly 30 is generally U-shaped and thus has two opposed side walls 84 and a front wall 86, each of which is preferably made of a transparent material such as plexiglass. The side walls 84 of the guard assembly 80 are spaces outwardly from the side walls 34 of the tank assembly 30 and, similarly, the front wall 86 of the guard assembly 80 is spaced outwardly from the front wall 32 of the tank assembly 30. Consequently, with the guard assembly 80 in its raised position, the guard assembly 80 encompasses the tank assembly 30 in the desired fashion. A separate motor 90 is mechanically connected by a drive shaft 92 (FIG. 2) to internally threaded bosses 94 (FIG. 2) to raise the guard assembly 80 between its upper and lower positions in a fashion similar to the tank assembly 30.

In operation, with both the guard assembly 80 and tank assembly 30 moved to their lower position (FIG. 1) free access to the workpiece 16 as well as the workpiece support area 14 is provided. Thus, the workpiece 16 can be easily attached to, or removed from, the workpiece support area 14.

Once the workpiece 16 is attached to the workpiece support area 14 by the holder assembly 18, both the guard assembly 80 and the tank assembly 30 are moved to their machining or raised positions (FIG. 2). In doing so, the tank assembly 30 forms the reservoir 74 around the workpiece 16 and the seal 72 is inflated, thus sealing the tank assembly 30 to the housing 12. Thereafter, the reservoir 74 is filled with a dielectric fluid and the EDM operation takes place in the normal fashion. Following completion of the EDM operation, the dielectric fluid is drained from the reservoir 74 and the seal 72 is deflated. Thereafter, both the tank assembly 30 and guard assembly 80 are moved to their retracted or lower position (FIG. 1) which again provides free access to the workpiece 16 for its removal and reinstallation of a new workpiece on the workpiece support area 14.

A primary advantage of the device of the present invention is that, by providing free access to the workpiece 16 upon completion of the EDM operation, automatic material handlers or robots can be employed to remove the workpiece 16 and install the next workpiece for the EDM operation.

Although, in the preferred embodiment of the invention, the tank assembly 30 is movable between a lower and a raised position in order to facilitate access to the workpiece, often directions of movement of the tank assembly 30 are also possible. For example, the tank assembly 30 could alternatively be moved to a retracted position behind the workpiece in order to facilitate access to the workpiece.

Having described my invention, however, many modifications thereto will become apparent to those skilled in the art to which it pertains without deviation from the spirit of the invention as defined by the scope of the independent claims.

I claim:

1. An apparatus for electrical discharge machining comprising:
   a housing having a workpiece support area and a rear wall extending upwardly from a rear edge of said workpiece support area;
   workpiece support means secured to said housing within said workpiece support area for holding a workpiece;
   means attached to said housing for performing an electrical discharge machining operation on the workpiece secured to said workpiece support means;
   a tank assembly, said tank assembly including a front wall and two spaced apart side walls, said side walls each having a front edge secured to opposite edges of said front wall, said side walls each having a rear edge adjacent to said housing rear wall when said tank assembly is in a machining position, said workpiece support means being positioned between said side walls;
   means for moving said tank assembly between said machining position and a retracted position;
   means for sealing said tank assembly in said machining position to enable said tank assembly to hold a dielectric fluid;
   a channel attached to said housing for supporting and positioning said sealing means against said tank assembly, said channel extending along said housing rear wall and side walls and front wall of the tank, said sealing means comprising an inflatable bladder which, upon inflation, sealing engages said tank assembly along said front wall, said side walls and along said upwardly extending wall;
   wherein in said machining position said tank assembly encompasses said workpiece secured to said workpiece support means; and
   wherein in said retracted position said tank assembly is spaced away from a workpiece secured to said workpiece support means to facilitate access to a workpiece secured to said workpiece support means.

2. The invention as defined in claim 1 wherein said tank assembly includes one of said front wall and said side walls having an upper edge and wherein said upper edge is positioned below a workpiece secured to said workpiece support means when said tank assembly is in said retracted position.

3. The invention as defined in claim 1 and comprising a guard surrounding at least a portion of said tank assembly and means for moving said guard between a lower and an upper position.

4. The invention as defined in claim 1 wherein said moving means comprising means for moving said tank assembly to a position intermediate said machining and said retracted position.

5. The invention as defined in claim 1 wherein said front wall and each of said side walls comprises two spaced apart panes, said panes forming a chamber in said housing wall, and an overflow opening in said wall pane closest to said workpiece support means.

6. The invention as defined in claim 1 wherein said moving means comprises a threaded boss secured to said tank means, a threaded shaft which threadably engages said boss, and means for rotatably driving said shaft.

7. The invention as defined in claim 6 and wherein said moving means further comprises a second threaded boss secured to said tank assembly at a position laterally spaced from said first boss, a second threaded shaft which threadably engages said second boss, and means for rotatably driving said first and second shafts in unison with each other.

* * * * *